Figure 1:
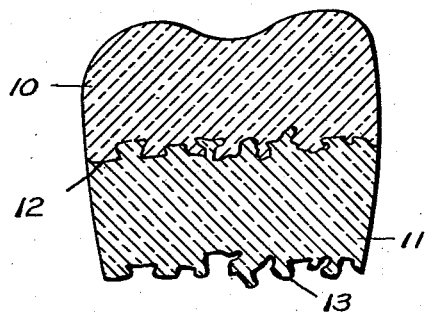

July 31, 1945.     J. A. SAFFIR     2,380,468
ARTIFICIAL TEETH
Filed July 29, 1941

INVENTOR
JACOB A. SAFFIR
BY W. T. Sullivan
ATTORNEY

Patented July 31, 1945

2,380,468

UNITED STATES PATENT OFFICE 2,380,468

ARTIFICIAL TOOTH

Jacob A. Saffir, Chicago, Ill., assignor to The Dentists' Supply Company of New York, New York, N. Y., a corporation of New York Application July 29, 1941, Serial No. 404,483

2 Claims. (Cl. 32—8)

This invention relates to artificial teeth which will simulate the trituration action of natural teeth set in healthy peridental membrane.

Artificial teeth constructed as hereinafter described are adapted to yield slightly during the trituration action or while food is being masticated, and to return to normal position as the pressure of trituration is removed. Such a natural effect is a very desirable property in an artificial tooth, inasmuch as one of the greatest disadvantages in present artificial dentures is their rigidity which tends to make them unsuitable in many mouths when they are brought into contact with each other either during mastication or during speech. This frequently results in a period of considerable strain for a patient who is learning to use new dentures.

This rigidity of present artificial dentures may gravely injure the mouth of the wearer due to the extreme pounding incident to the use of non-flexible teeth. This pounding, especially if biting pressures have not been perfectly equalized throughout the denture, will cause absorption of alveolar bone in the maxilla and the mandible. The dentures become loose, unmanageable, and are a source of constant annoyance. They have to be relined or remade with inconvenience and extra expense to the patient. Frequently, as a result of this condition, a point is reached where so little alveolar bone may be left that it is extremely difficult for the patient to wear any denture, maxillary or mandibular, either for appearance or masticating purposes.

This traumatic absorption of bone is not an unusual result of the wearing of the present rigid dentures having non-flexible teeth. By the use of artificial teeth constructed as hereinafter described, this condition can be greatly alleviated.

This problem has long been recognized and numerous attempts have been made to remedy this condition by the use of a complicated arrangement of soft rubber pads between the tooth and plate, and frequently, in combination with springs, collars and other devices. However, these methods were very unsatisfactory due to the action between the soft rubber, the metallic bands, springs, and the teeth. Also, it was necessary to employ means for concealing the soft rubber cushion.

It is a primary object of the present invention to provide artificial teeth adapted to simulate the trituration action of natural teeth set in healthy peridental membrane.

Another object of the invention is to provide artificial teeth adapted to yield slightly under masticating action.

Another object of the invention is to provide artificial teeth for dentures which will minimize the pounding effect on the mouth of a wearer commonly occurring during use of dentures heretofore employed.

Another object of the invention is to provide an improved denture adapted to minimize absorption of alveolar bone.

Another object of the invention is to provide artificial teeth adapted to minimize the clicking noise characteristic of artificial teeth heretofore used.

Another object of the invention is to provide an improved denture which closely simulates the action of natural teeth whereby a patient may relatively quickly become accustomed to wearing and using such denture.

Another object of the invention is to provide artificial teeth of the above type which are relatively inexpensive, and which may be incorporated in a denture by a simple technic similar to the technic heretofore employed.

According to the invention, the tooth is formed of materials having different physical characteristics, the occlusal portion of the tooth being formed, for example, of a moderately hard plastic resin, such as methyl methacrylate. The gingival portion of the tooth is formed of a suitable elastic plastic, such as a polyvinal resin. The line of juncture between the relatively hard occlusal resin and the elastic gingival resin is preferably of irregular interlocking form to strengthen the bond between these resins. Teeth formed as above described may be set into a plate of suitable material such as polymer methyl methacrylate. When dentures comprising teeth of the above type are subjected to a triturating or masticating action by a patient, the elastic resin permits a slight yielding to occur coresponding to the action of natural teeth set in healthy peridental membrane.

In forming posterior artificial teeth, I may employ three different plastic resins, wherein the occlusal surface will comprise an extremely hard polymer, such as styrene. This polymer forms a thin layer which is backed by a more flexible hard resin, such as methyl methacrylate. A polyvinal polymer, which is relatively elastic, may comprise the balance of the tooth.

In forming anterior teeth, I may also employ three different plastic resins, and in this instance, the major portion of the tooth may be formed of a relatively hard resin, such as methyl methacrylate, which is encased by a thin film of an extremely hard resin, such as styrene. The methyl methacrylate at the gingival portion of the tooth may be cushioned by a relatively elastic resin, such as a polyvinal polymer. A layer of methyl methacrylate may be provided at the gingival end of the tooth for copolymerization with the plate material.

Thus, an artificial tooth is provided which has an occlusal surface of relatively hard resin suitable to withstand the impacts occurring at such surface backed by a layer or layers of relatively elastic resin which gives a cushioned effect during mastication.

Figure 2:
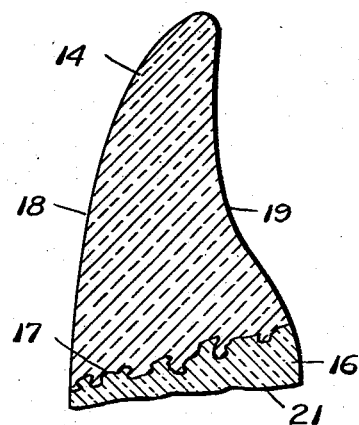
Figure 3:
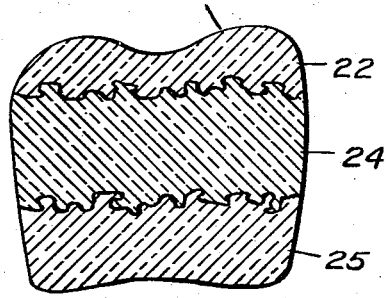
Figure 4:
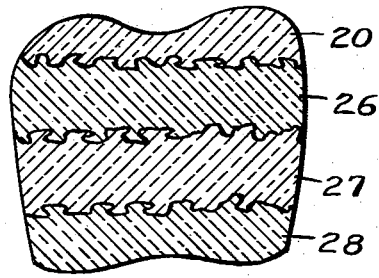
Figure 5:
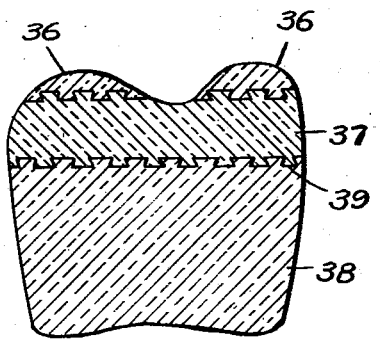

The drawing illustrates embodiments of the invention and the views therein are as follows:

Figure 1 is a transverse sectional view of a molar embodying my invention in its simplest form, Figure 2 is a transverse sectional view illustrating the construction of an anterior tooth, Figure 3 is a transverse sectional view of a posterior tooth illustrating a modification of my invention, Figure 4 is a transverse sectional view of a posterior tooth, illustrating a further modification of my invention, and Figure 5 is a view similar to Figure 1 but wherein only the masticatory portion of the tooth is formed of a relatively hard resin.

Referring now to the drawing, and particularly to Figure 1, the occlusal portion of the crown is indicated at 10 and the gingival portion of the tooth is indicated at 11. The occlusal portion 10 is preferably formed of a moderately hard resin, such as methyl methacrylate.

The gingival portion 11 of the tooth may be composed of a suitable elastic plastic of the elasto resin group. There are many plastics in this group, but I preferably employ one of the polyvinal plastics, such as the co-polymers of vinyl acetate and vinyl chloride.

The elasticity of the above co-polymer can be controlled by varying the amounts of either polymer. The co-polymer can be made less flexible by adding more vinyl chloride, and can be made more flexible by increasing the amount of vinyl acetate.

The above thermo-plastic (co-polymer of vinyl acetate and vinyl chloride) is non-inflammable and is highly resistant to acids, alkalies, sunlight, ozones, and any temperature changes that may occur in the mouth. The line of juncture between the relatively elastic resin 11 and the harder resin 10 is preferably of irregular form, as indicated at 12, whereby a strong bond is effected between the two polymers. Also, I prefer that the line of juncture be of generally dovetail form, so that in addition to providing considerable bonding area between the two polymers, a mechanical interlocking is effected. The extreme gingival edge 13 of the tooth which will be set into a plate of suitable material, such as the polymer methyl methacrylate, is also preferably of generally dovetail form to insure a strong bond between the tooth and plate.

The resin 10 provides an occlusal surface which is sufficiently hard to withstand the wear and impacts occurring at such surface and the resin 11 provides a cushioning effect similar to the cushioning of the peridental membrane in natural teeth.

Figure 2 illustrates an anterior tooth in cross-section and the incisal portion 14 is formed of a relatively hard plastic, such as methyl methacrylate. The hard plastic extends throughout that portion of the tooth which will come in contact for incisive purposes with an opposing upper or lower tooth. The gingival portion of the tooth 16 is composed of a suitable elastic resin, such as co-polymers of vinyl acetate and vinyl chloride described in connection with Figure 1. The juncture line 17 between the resins 14 and 16 is preferably of irregular form to effect a strong bond, as previously pointed out. The labial surface of the tooth is indicated at 18, and the resin 16 preferably increases slightly in thickness proceeding towards the lingual surface 19 of the tooth. Of course, the gingival end 21 of the tooth may be of irregular contour to effect a strong bond between the tooth and plate material within which it is set.

Figure 3 illustrates a posterior tooth in cross-section wherein three plastic resins are employed. The occlusal portion 22 is formed of an extremely hard polymer, such as styrene, and this polymer may extend from the occlusal surface 23 towards the gingival area for a distance comprising $\frac{1}{16}$ to $\frac{1}{3}$ of the entire tooth length.

This polymer 22 should only be used as a thin layer, and is backed by a relatively elastic polymer 24 such as a polyvinal polymer. This polyvinal polymer is backed by a harder resin 25, such as methyl methacrylate.

Figure 4 illustrates a posterior tooth generally similar to that illustrated in Figure 3, but wherein the extremely hard polymer 20 is backed by a hard resin 26, such as methyl methacrylate, which in turn is backed by a relatively elastic resin 27, such as a polyvinal polymer. The polymer 27 may be backed by methyl methacrylate as indicated at 28.

Figure 5 illustrates a posterior tooth in transverse section, and in this instance, the masticatory portion including the cusps 36 which engage an opposing posterior tooth during the masticating process is formed of a hard resin. The medial portion of the tooth 37 may be formed of a more elastic or flexible resin, and the portion 38 including the gingival end of the teeth may be formed of a slightly harder resin than the portion 37. Of course, the portion 38 may be formed of the most elastic resin, if desired, to provide a cushioning effect. It will be noted that the juncture line 39 is of regular or uniform dovetail form, and I contemplate that either this form of mechanical interlocking or the form illustrated in Figure 1 may be employed. However, when resins which co-polymerize are used, it is not necessary that any form of mechanical interlocking be provided.

Although I preferably employ a hard plastic resin, such as styrene for the occlusal or masticatory portion of the tooth various other resins of the phenol formaldehyde, polypeptides, or casein group of plastics may be used. Although these resins are thermosetting and will not ordinarily bond with the thermoplastic resins. I have found that they may be suitably bonded to the thermoplastic resins by mechanical interlocking, as illustrated, or by the use of suitable cements.

The particular method employed in moulding the teeth constitutes no essential part of my invention and any well known method of moulding plastic resins may be used. However, I preferably mould all layers of the tooth at the same time, but one layer may be first formed and additional layers subsequently moulded or bonded thereto.

I have illustrated both anterior and posterior teeth formed with a cushioning layer, but I contemplate that a denture may be formed wherein only the posterior teeth are provided with a cushioning layer since the greatest pressure is exerted by the posterior teeth during mastication.

In forming a denture as described herein, it is not necessary to employ pins or similar means for anchoring the teeth to the denture plate, but I contemplate that anchoring pins may be embedded in the teeth during the moulding operation if desired.

Although I have illustrated and described preferred forms of my invention, I contemplate that numerous and extensive departures may be made therefrom without departing from the spirit of my invention and the scope of the appended claims.

The invention is hereby claimed as follows:

1. A tooth for artificial dentures comprising an impartible one-piece anatomically-configured body formed of a plurality of synthetic resins of diverse physical characteristics locally distributed in said body as: a synthetic resin base portion for direct setting in and fused union with the gingival portion of a molded resinous denture plate, a masticating head portion of polymerized synthetic resin having a high coefficient of resistance to deformation, fracture and abrasion, and a relatively yieldable trunk portion of polymerized synthetic resin having a high coefficient of elastic deformation disposed between said masticating head portion and said base portion, molecularly united with said base and with said masticating head portion by fusion with the respective component resin of each and constituting with said portions a buccally, lingually, gingivally and occlusally yieldable anatomically-configured impartible one-piece tooth devoid of telescopic joints, seams, casings or cells within which food and bacteria may lodge.

2. A tooth for artificial dentures comprising an impartible one-piece anatomically-configured body formed of a plurality of synthetic resins of diverse physical characteristics stratified in said body as: a synthetic resin base portion for direct setting in and fused union with the gingival portion of a molded resinous denture plate, a masticating head portion of polymerized synthetic resin having a high coefficient of resistance to deformation, fracture and abrasion, and a relatively yieldable central stratum of polymerized synthetic resin having a high coefficient of plastic deformation sandwiched between said base portion and said masticating head portion, molecularly bonded to each by fusion with the respective resin of each and constituting with said base and head portions a buccally, lingually, gingivally and occlusally yieldable anatomically-configured one-piece impartible stratiform composite tooth devoid of telescopic joints, seams, casings or cells within which food and bacteria may lodge.

JACOB A. SAFFIR.